O. C. THOMPSON.

BOX BLANK MACHINE.

APPLICATION FILED SEPT. 23, 1919.

Reissued Feb. 15, 1921.

15,045.

6 SHEETS—SHEET 1.

Inventor
Osceola C. Thompson
By his Attorney
Edward Dunne Jr.

O. C. THOMPSON.
BOX BLANK MACHINE.
APPLICATION FILED SEPT. 23, 1919.
Reissued Feb. 15, 1921.
15,045.
6 SHEETS—SHEET 2.
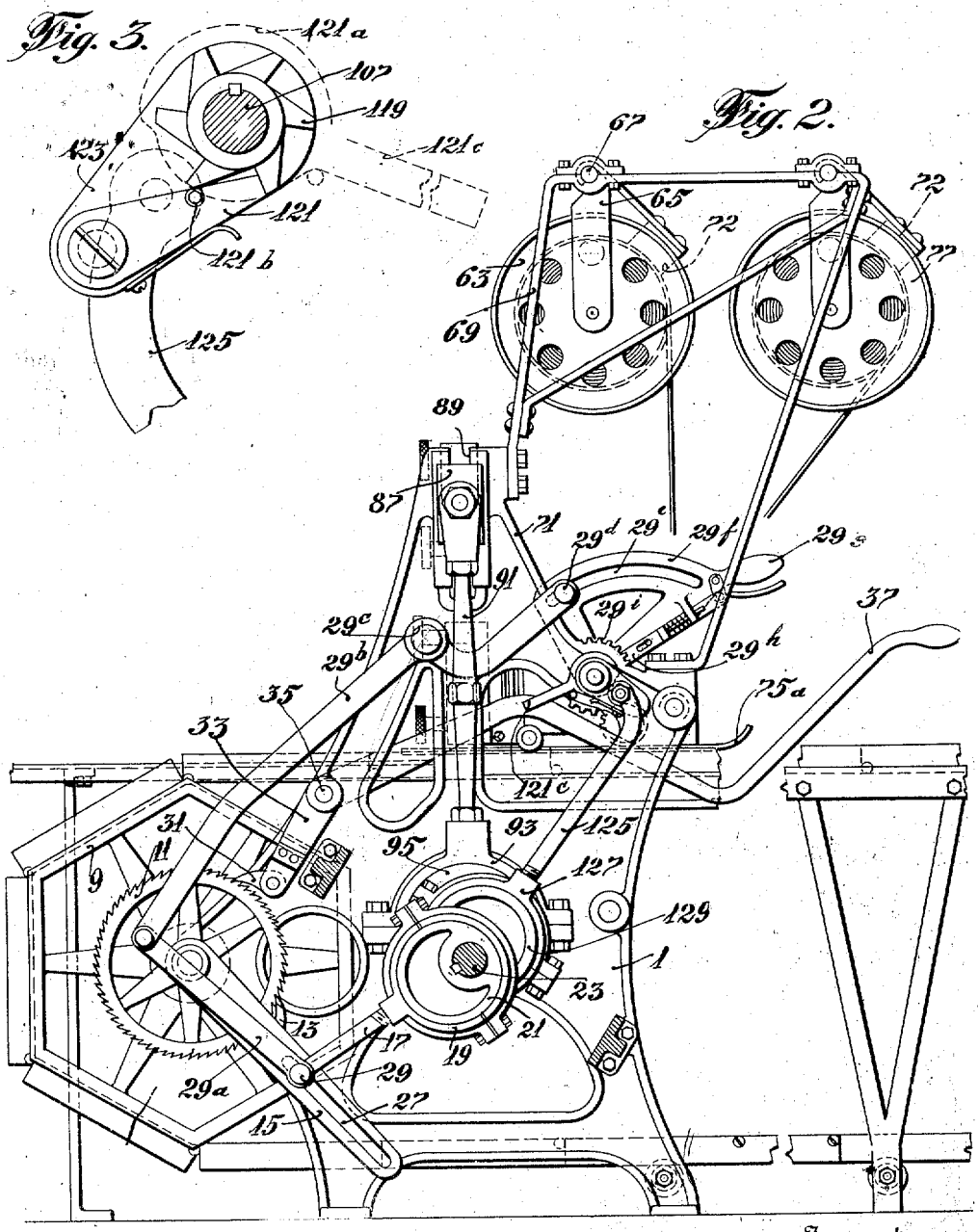
Inventor
Osceola C. Thompson
By his Attorney
Edward F. Dunne Jr.

O. C. THOMPSON.

BOX BLANK MACHINE.

APPLICATION FILED SEPT. 23, 1919.

Reissued Feb. 15, 1921.

15,045.

6 SHEETS—SHEET 3.

Inventor
Osceola C. Thompson

By his Attorney
Edward Adams Jr.

O. C. THOMPSON.
BOX BLANK MACHINE.
APPLICATION FILED SEPT. 23, 1919.
Reissued Feb. 15, 1921. 15,045.
6 SHEETS—SHEET 4.
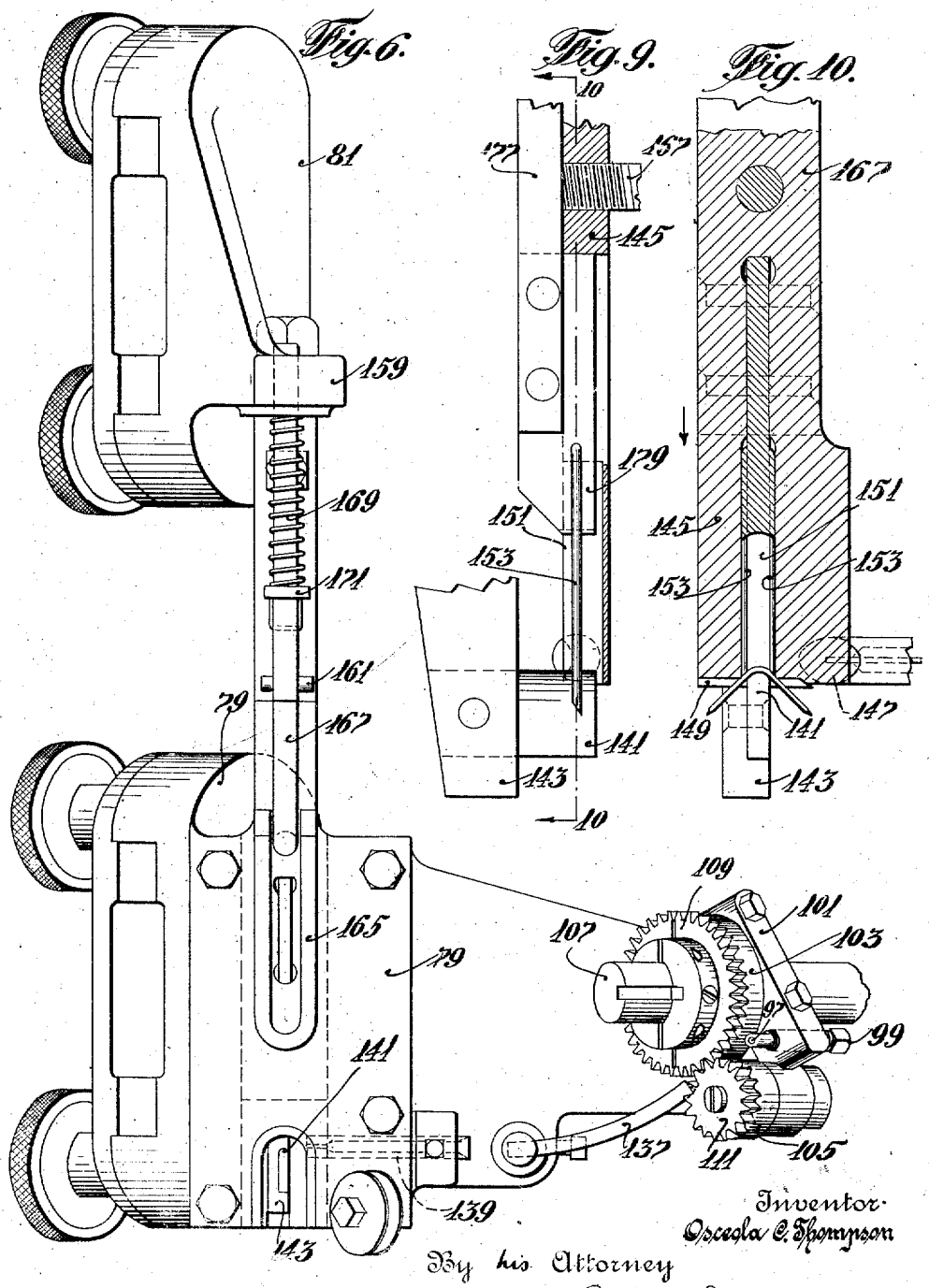
Inventor:
Osceola C. Thompson
By his Attorney
Edward Dumm Jr.

O. C. THOMPSON.

BOX BLANK MACHINE.

APPLICATION FILED SEPT. 23, 1919.

Reissued Feb. 15, 1921.

15,045.

6 SHEETS—SHEET 5.

Inventor
Osceola C. Thompson

By his Attorney
Edward Dunne Jr.

O. C. THOMPSON.

BOX BLANK MACHINE.

APPLICATION FILED SEPT. 23, 1919.

Reissued Feb. 15, 1921.

15,045.

6 SHEETS—SHEET 6.

Inventor
Osceola C. Thompson
By his Attorney
Edward F. Dunne Jr.

BEST AVAILABLE COPY

UNITED STATES PATENT OFFICE.

OSCEOLA C. THOMPSON, OF WHITE PLAINS, NEW YORK, ASSIGNOR TO WIREBOUNDS PATENTS COMPANY, A CORPORATION OF MAINE.

BOX-BLANK MACHINE.

15,045. Specification of Reissued Letters Patent. Reissued Feb. 15, 1921.

Original No. 1,258,625, dated March 5, 1918, Serial No. 695,104, filed May 4, 1912. Application for reissue filed September 23, 1919. Serial No. 325,787.

*To all whom it may concern:*

Be it known that I, OSCEOLA C. THOMPSON, a citizen of the United States, and a resident of White Plains, county of Westchester, and State of New York, have invented an Improvement in Box-Blank Machines, of which the following description, in connection with the accompanying drawings, is a specification, like characters on the drawings representing like parts.

This invention relates to machines for making box blanks, such, for example as comprise a series of sections of thin wood or other suitable material bound together by wires stapled to the sections. The box blank is formed in the machine and subsequently folded and assembled with its ends to form a complete box in the usual manner.

The character of the invention may be best understood by reference to the following description of an illustrative embodiment thereof shown in the accompanying drawing, wherein:

Fig. 2 is a partial side elevation of the machine shown in Fig. 1;

Figure 1:
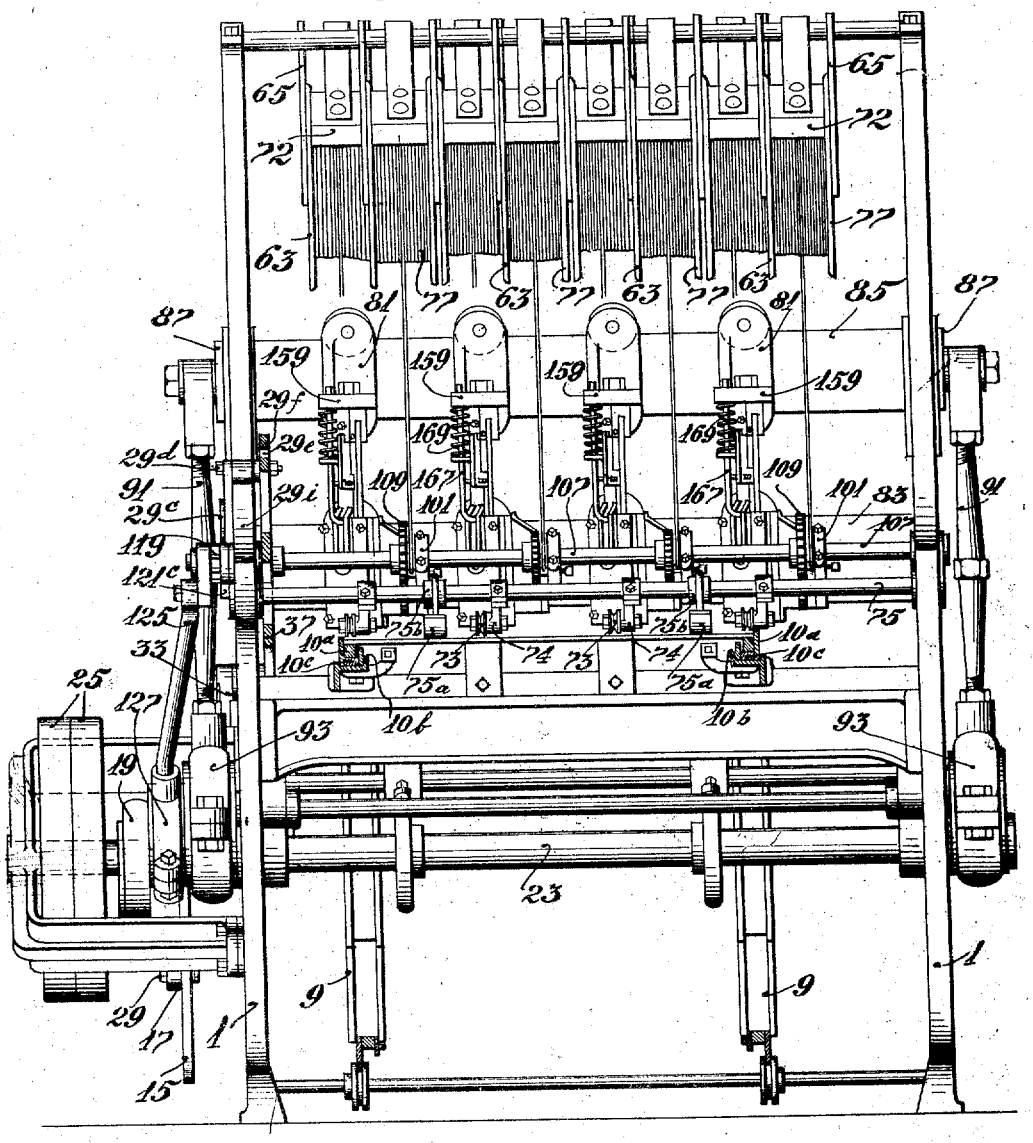
Figure 1 is a front elevation of the illustrative box blank machine shown herein as embodying the invention.
Figure 5:
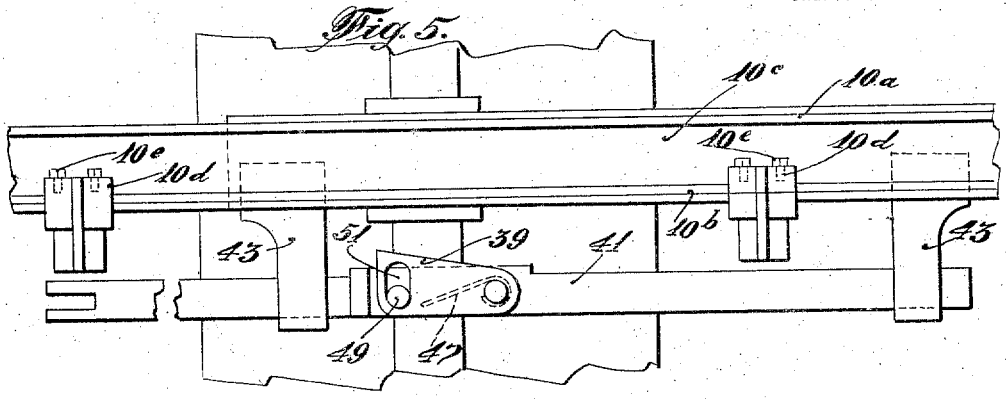
Figure 4:
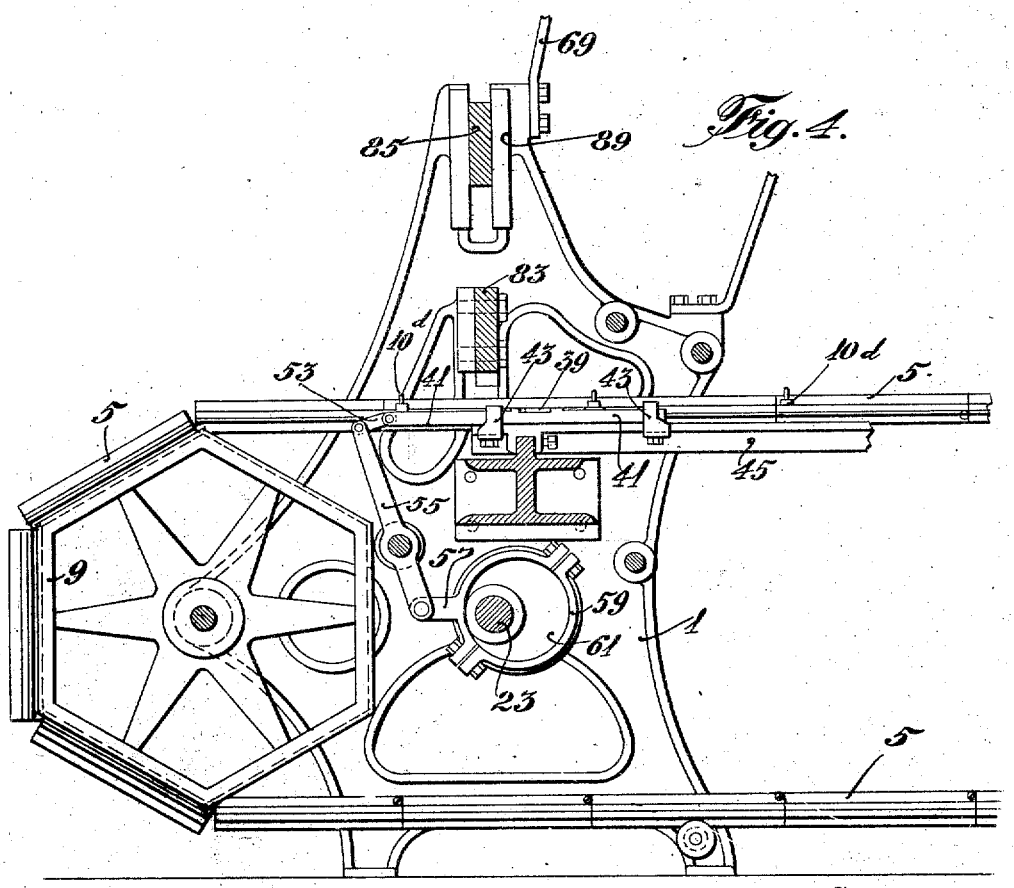
Figure 7:
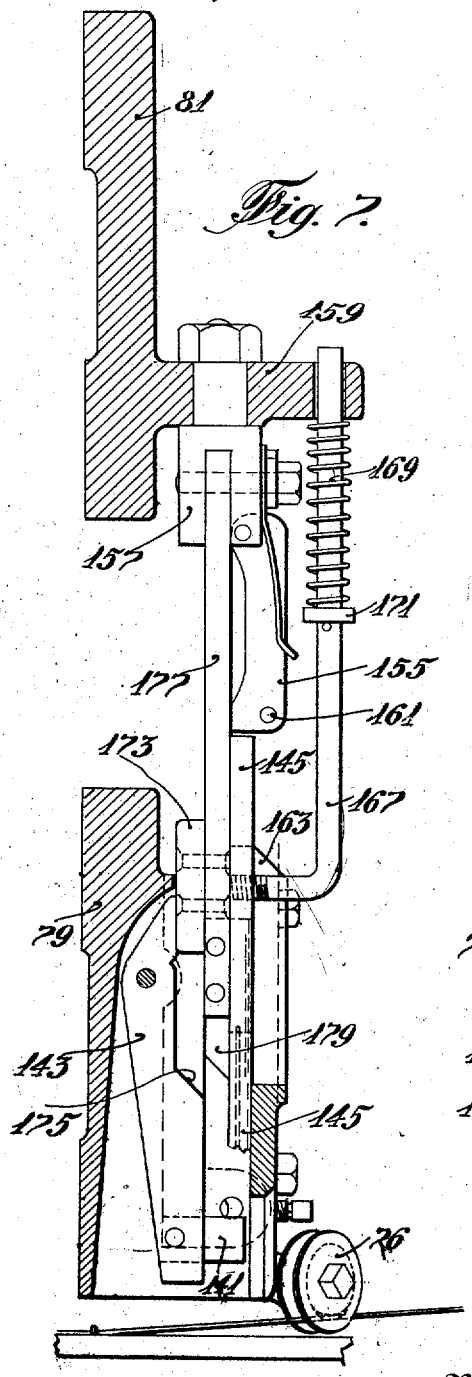
Figure 15:
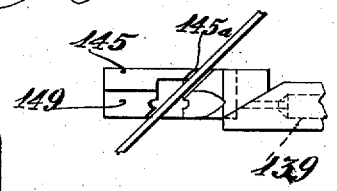
Figure 8:
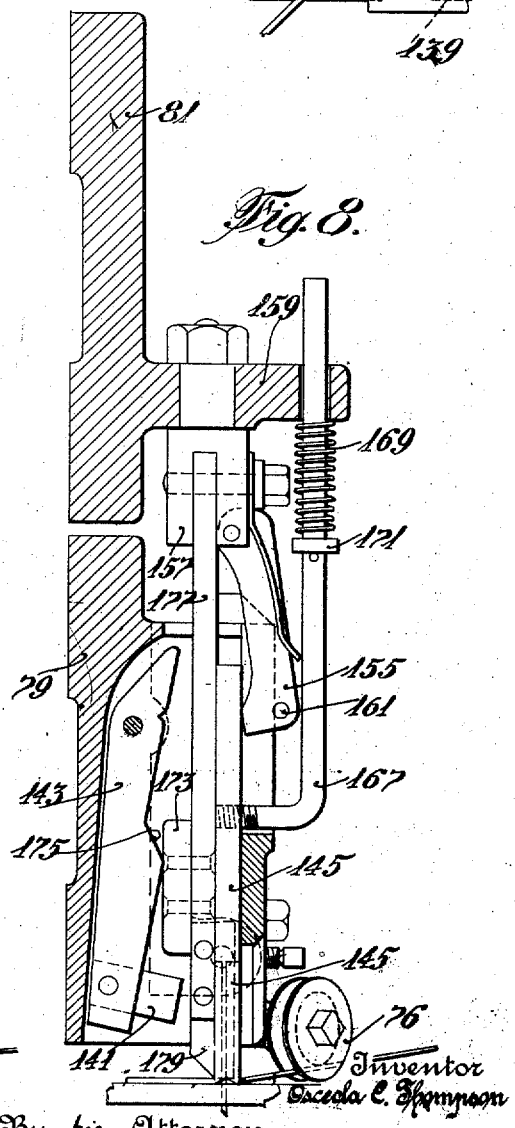
Figure 11:
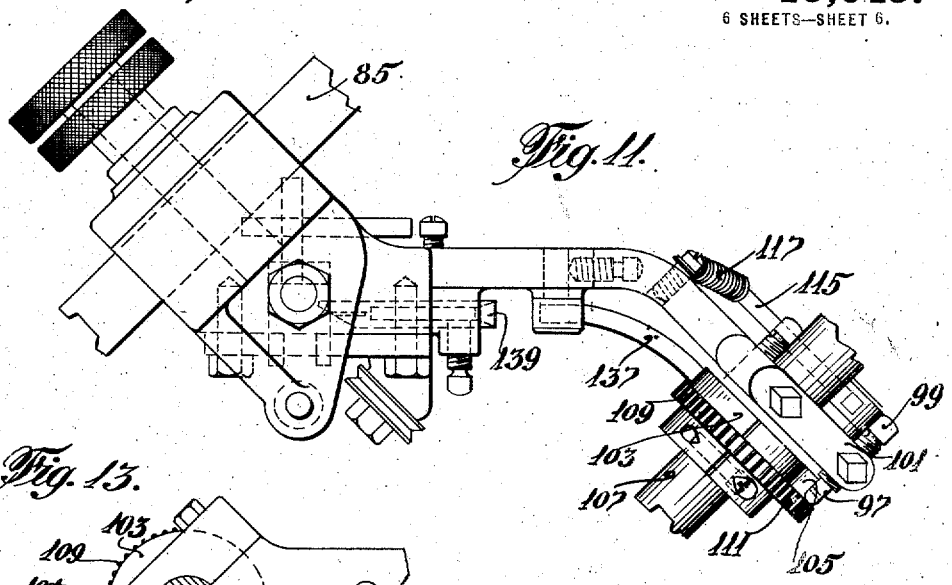
Figure 13:
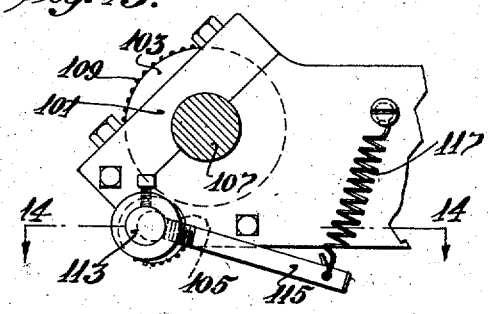
Figure 14:
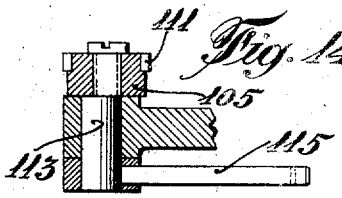
Figure 12:
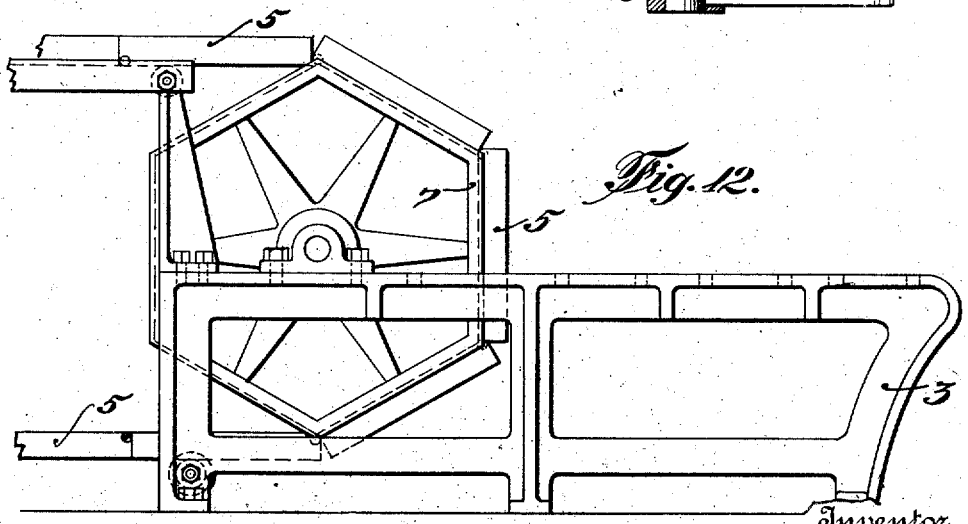

Fig. 3 on an enlarged scale is a detail of a staple stock feed control;

Fig. 4 is a vertical longitudinal section through a portion of the machine shown in Fig. 1;

Fig. 5 on an enlarged scale is a plan view of a carriage skip mechanism shown in Fig. 4;

Fig. 6 on an enlarged scale is a detail in perspective of the staple forming and driving mechanism;

Fig. 7 is a vertical section through parts shown in Fig. 6;

Fig. 8 is a view similar to Fig. 7 showing parts in a different position;

Figs. 9 and 10 are sectional details of the staple forming and driving mechanism;

Fig. 11 is a plan of the staple forming and driving mechanism shown in Fig. 6;

Fig. 12 is a side elevation of the opposite end of the machine from that shown in Fig. 2; and Figs. 13, 14 and 15 are details to be referred to.

Fig. 13 is a detail elevation of the feeding means for the wire;

Fig. 14 is a section on line 14—14 of Fig. 13;

Fig. 15 is an elevation in detail of a portion of the staple forming mechanism.

Referring to the drawing, the illustrative machine there shown comprises frames 1 and 3 (Figs. 2 and 12) for supporting a carriage on which the box sections are assembled to form a box blank. As shown herein, this carriage comprises link side chains 5 passing around idler sprocket wheels 7 (Fig. 12) at one end of the machine and around driven sprocket wheels 9 (Fig. 2) at the opposite end of the machine, said sprocket wheels being mounted on shafts journaled in bearings carried by said frames 1 and 3. To render the chains adaptable for blank sections of different assembled lengths, the bearings of the idler sprocket wheels are adjustable on their frame toward or from said driven sprocket wheels. To provide for sections of different widths the sprocket wheels at one side of the machine may be adjusted relatively to those at the opposite side of the machine in the usual manner.

The side chains 5 are composed of links formed to receive the cleats for the sections. Each link comprises side bars $10^a$ and $10^b$ secured to a base bar $10^c$ by screws or other suitable means.

To position and prevent the sections and cleats from sliding along the links, spacer blocks $10^d$ are provided preferably formed to straddle the link bar $10^b$ and are secured in various positions on said bar by set screws $10^e$ according to the dimensions of the sections and cleats used.

The carriage may be driven in a variety of ways for different purposes. To impart step-by-step movements to the carriage each movement being preferably a distance corresponding to the space between staples, the driven sprocket wheel shaft (Fig. 2) is provided with a ratchet wheel 11 engaged by a spring pressed pawl 13 carried by a rocking arm 15 having one end journaled loosely on said sprocket shaft and its opposite end portion connected by a rod 17 with an eccentric strap 19 on an eccentric 21 fast

BEST AVAILABLE COPY on a main driving shaft 23 journaled in bearings in the frame 1 and driven at the opposite side of the machine by a belt pulley 25 (Fig. 1) in the usual manner.

To vary the length of the step feed of the carriage the pawl carrying arm 15 is provided with an elongated slot 27 receiving an adjusting pin 29 in an eye of the eccentric rod 17 so that by sliding said pin in said slot various distances from the sprocket shaft the throw of the pawl and the feed step of the carriage can be varied.

It is desirable to vary the spacing of the staples at will and during the running of the machine. This may be conveniently effected by manually operable means conveniently accessible to the operator for sliding the pin 29 in the elongated slot 27 of the pawl carrying arm 15 for advancing the ratchet wheel 11 step-by-step. To this end the pin 29 is connected by a link $29^a$ to a lever $29^b$ fulcrumed intermediate its ends on a pin $29^c$ projecting from one of the side frames of the machine. To rock this lever, its upper end is provided with a block $29^d$ projecting from a face thereof and into an arcuate slot $29^e$ of a segment $29^f$ pivoted to the machine frame and having a handle $29^g$ whereby the segment may be readily rocked. To fasten the segment in different positions of adjustment, the handle is provided with a spring pressed ratchet tooth $29^h$ cooperating with a ratchet $29^i$ fast on the machine frame.

By the above described construction the handle $29^g$ may be gripped and rocked to various positions of adjustment and in so doing it will rock the lever $29^b$ and the latter, through the link $29^a$, will slide the adjusting pin 29 radially toward or from the fulcrum of the rocking arm 15 and thereby vary the length of the step feed.

This is a very advantageous construction since, for example, two different running positions may be used on some boxes or crates, one position for the top and bottom and the other for the sides whereby a given number of staples can be placed in the top and bottom and a predetermined number of staples can be placed in the sides, the spacing of the staples in the latter being different from that of the top and bottom. Also staples can be placed at the proper places on the side of crate; that is, in the slats only and not in the spaces between slats.

This control may also be used to prevent the application of staples at joints between the sides of the box. The handle $29^g$ may be set to a normal running position and may be shifted to lengthen the step over a joint and then back to its normal running position.

It is desirable to not only provide an automatic step-by-step feed of the carriage, but also at times to manually control the feed thereof. To this end a ratchet gravity pawl 31 (Fig. 2) is provided, carried by an arm 33 fast on a stud 35 on the frame 1 and adapted to be rocked by a long handle 37 fast on said stud and projecting rearwardly to a point conveniently accessible to the operative of the machine. During the automatic step-by-step advance of the ratchet wheel the pawl 31 will wipe idly over the teeth thereof. When it is desired to actuate said ratchet independently of the other feeds described, the handle 37 may be grasped and rocked to impart movement to said ratchet. This will be advantageous for a variety of purposes. Among others, this handle may be used to control the carriage feed and prevent the application of staples in the joints between sections. This may be done in different ways, as by prolonging a feed step at the same rate of speed or by increasing the speed of feed to produce a greater feed step in a given period of time. Also by the use of this handle the first blank section may be fed to bring the same at a proper position beneath the stapling mechanism to receive the first staple and to feed each successive section to its proper position for its first staple. It may also be used to vary the spacing of the staples in the top and bottom from the spacing in the sides in some cases.

One important feature of the invention relates to automatic means for preventing stapling at a joint between sections. As shown herein, this means comprises detectors located on opposite sides of the machine, each comprising a pawl 39 (Figs. 4 and 5) pivoted on a horizontal bar-like carrier 41 adapted to reciprocate in guides 43 secured to an angle bar 45 suitably supported by the machine frame. The pawl 39 is normally pressed in toward the chain adjacent thereto by a spring 47, such movement being limited by a pin 49 on the carrier occupying an elongated eye 51 in said pawl.

To reciprocate said pawl carrier in its guides one end thereof is connected by a link 53 (Fig. 4) to a rocking lever 55 fulcrumed between its ends on a stud on the frame, said lever in turn being connected by a short arm 57 to an eccentric strap 59 on an eccentric 61 fast on the main-shaft 23 referred to.

As stated, to properly space and position the box blank sections on the carriage, the latter is provided at intervals with appropriate spacer blocks. These blocks have projections extending outwardly from the chains and into the paths of the detector pawls. As a result, when said pawls travel to the right in Fig. 5 their inclines will wipe across the ends of said spacer blocks and then spring back of them, so that on opposite travel of said pawls they will engage the spacer blocks and if moving more rap-

BEST AVAILABLE COPY idly than the latter, will pick up and feed the carriage independently of its automatic pawl and ratchet step feed.

To avoid stapling at a joint between sections the detector actuating means described may be operated to prolong a feed step or it may be arranged to increase the speed of the feed to produce a longer feed step in a given period of time; or by maintaining a uniform speed of feed, but prolonging the period during which the feed step continued. These results can be had by various means, as by driving the detector operating eccentrics at different speeds or by varying the lengths of the driving connections from the eccentrics to the detector carriers.

The detectors are arranged relatively to the stapling mechanism so as to cause the skip in the feed to occur at the proper time with respect to the operations of said mechanism.

It will be noted that while the pawl 39 may not engage each block $10^d$ at the same point of travel in its motion imparting movement to the left in Fig. 5, it nevertheless advances each block to the same position relative to the stapling mechanism, thus automatically positioning each box section in predetermined selected staple receiving position.

While, as shown herein the spacer blocks for the box blank sections are controlled by the detectors, it will be understood that the control is susceptible of considerable modification and that it might be had by other devices associated with the box blank carriage.

Having described the carriage, the automatic feed therefor, the manual control and the automatic mechanism for avoiding stapling at a joint between sections, I will now describe the means for applying the binding wire to the sections and then describe the means for stitching or forming and driving staples to secure said wire to said sections.

The binding wire may be led from any suitable source of supply, herein illustrated as a series of reels 63 (Fig. 2) loosely mounted on a shaft carried by hangers 65 having hooks for removable connection with a rod 67 carried by a frame 69 secured to uprights 71 of the machine frame 1. To prevent the wire from jumping over the ends of the reels and to retard the unwinding of the wire from the reels, they may be provided with gravity brake shoes 72 pivotally connected to said reel supporting rod 67. The wire is led from the reels down toward the carriage to guide rollers 73 carried by brackets 74 on a horizontal rod 75 extending from side to side of the machine slightly above the carriage chains and thence to and beneath rollers 76 carried by the stitchers. The leading ends of the wires are suitably secured to the first section and progressive movements of the carriage will cause them to lie across and connect the box blank sections.

To contribute to the positioning of the sections as they are led beneath the stitchers, shoes $75^a$ are provided conveniently pivotally connected to and depending from said horizontal rod 75, said shoes being slotted to permit their vertical adjustment to conform to sections of different thicknesses and are held in their positions of adjustment by suitable clamping collars $75^b$ on opposite sides thereof.

To secure the wires to the sections a second set of reels 77 is provided, conveniently similar to those just described, said reels 77 carrying a supply of stock for forming the staples for securing the binding wires to the sections. The staple wires are led from said reels down toward the carriage and to staple forming and driving mechanisms which I will now describe. One of these mechanisms is provided for each wire, and being similar, a description of one will suffice for all.

Referring more particularly to Figs. 6 to 11 inclusive, such mechanism comprises lower and upper heads 79 and 81 detachably and adjustably mounted on cross-bars 83 and 85, one of which is fixed to the side frames of the machine while the other is carried by blocks 87 adapted to slide vertically in guide ways 89 in the uprights of the machine side frames. To impart vertical reciprocation to said blocks 87 they are connected by pitmen 91 to eccentric straps 93 of eccentrics 95 fast on the main shaft 23 referred to.

To conduct the staple stock from the reels 77 to the lower heads 79 of the stitcher mechanism, guiding and feeding means is provided carried by an arm of said head and comprises an eye 97 in a reduced end of a screw 99 threaded into a bearing block 101 to be referred to. The wire is led from said eye between feed rolls 103 and 105, the former being splined to a shaft 107 journaled in bearings in said arm, said shaft being driven step-by-step as more fully hereinafter described. To impart a positive rotation to the feed rolls 103 and 105, they are provided with intermeshing gears 109 and 111.

To press the feed roll 105 toward the feed roll 103 and grip the wire between them, the roll 105 is loosely mounted on an eccentric shaft 113 (Fig. 13) having fast thereon an arm 115 urged in a direction to press said roller 105 toward said roller 103 by a coil spring 117 having one end connected to said arm and its opposite end connected to the head 79.

To drive the shaft 107 for the wire feed

BEST AVAILABLE COPY roller 103 it is extended through bearings in the side frames of the machine and projects beyond one of them and there receives a ratchet 119 (Figs. 1 and 3). To rotate this ratchet step-by-step distances corresponding to the stock lengths sufficient to form the staples, the ratchet is provided with a spring pressed actuating pawl 121 pivoted to the outer free end of a rocking arm 123 fulcrumed loosely on the shaft 107 and connected by a rod 125 to an eccentric strap 127 of an eccentric 129 fast on the main shaft 23 referred to.

One way of avoiding stapling at a joint between adjacent sides, and to avoid making staples which otherwise would be driven while the joint is passing, is by interrupting the wire feed. To this end the pawl 121 is provided with a cam 121[a] on the shaft 107 adapted to engage a roller 121[b] projecting from a face of said pawl 121 and controlled by a handle 121[c]. When this handle is in its position shown in Fig. 3, it will permit the pawl 121 to engage its ratchet 119 and impart a step-by-step feed thereto, but when the cam handle is rocked toward the left of Fig. 3, the pawl roller will ride along and up on said cam and be moved out from said ratchet and said pawl will be ineffective to transmit the step feed thereto. This will arrest the feed of the staple stock until the cam is turned to permit the pawl again to engage its ratchet.

The staple wire fed step-by-step by the rolls 103, 105 as described is led thence through a tube 137 (Figs. 6 and 11) to a horizontal cutting tube 139 having a chamfer end (Fig. 15) at a suitable angle to form the staple points. The wire is fed through this cutting tube over a loop-bar 141 carried by a holder 143 pivoted intermediate its ends in a recess in the heads 79, said holder being adapted to rock on its pivot to introduce said loop-bar into and out of a position beneath said wire as more fully hereinafter described.

To form a staple from the stock thus projecting beyond the cutting tube over the holder, there is provided a former 145 (Figs. 9, 10 and 15) having a corner vertically chamfered to correspond to the chamfer of the cutting tube end and having a cutting edge 147 for shearing off the stock projecting from the cutting tube. To receive the severed stock the lower end of the former is provided with a horizontal groove 149 of a depth corresponding to the diameter of the stock, so that when the former is brought down toward the loop-bar, as more fully hereinafter described, the severed stock will be temporarily held in said groove by said loop-bar.

To avoid driving both legs of a staple in the same grain of the wood and to cause the staple to closely straddle the binding wire, the stitcher heads are mounted obliquely to the direction of the lay of the binding wire (Fig. 11).

To bend the stock around the loop-bar, the former is provided with an elongated lateral recess 151 (Fig. 9) having therein opposed longitudinal grooves 153 (Fig. 10) each of a depth corresponding to the diameter of the staple stock and communicating with the horizontal stock receiving groove 149. As a result, on downward movement of the former the stock in the horizontal groove thereof is bent over the loop-bar 141 and into the longitudinal grooves of the former recess, thereby completing the staple.

To positively force the former downward to bend the staple stock over the loop-bar as described, there is provided a spring pressed dog 155 (Fig. 7) having its upper end pivoted to a block 157 bolted to an ear 159 projecting from the upper head 81. The lower end of said dog is directly above an upwardly projecting end of the former 145. As a result, when the upper head is moved downward (Fig. 8) the former 145 will also be moved downward and will bend the staple stock over the loop-bar to form a staple as described.

The former is not moved positively entirely to the face of the box section as shown in Fig. 8, but after the staple has been formed the feeding dog 155 is moved out of engagement with the end of the former 145 by a pin 161 projecting through said dog and adapted to engage beveled or cam ends 163 of ribs 165 on said lower head. To move the former yieldingly on down to the box blank and present the staple thereto the former 145 is connected to an L shaped rod 167, the upper end of which projects through an aperture in the upper head ear 159. A coil spring 169 is interposed between the lower face of said ear and a collar 171 fast on said rod 167.

To rock the loop-bar out from the position shown in Fig. 7 to the position shown in Fig. 8, there is provided a trip slide 173 secured to a back bar 177 pivotally connected to the dog block 157, said slide being adapted to engage an incline face 175 of the loop-bar holder 143 referred to, and thereby automatically rock said loop-bar out from beneath the staple loop and permit the staple to be carried down and present its points to the box section.

To contribute to the positioning of the binding wire during the stapling operation the former is provided with a groove 145[a] (Fig. 15).

The staple, being thus positioned on a box section, is then in readiness to be driven therethrough. To this end there is provided a driver 179 (Figs. 7 and 9) pro-

BEST AVAILABLE COPY jecting into the lateral recess 151 of the former, said driver being suitably secured to the back bar 177.

On downward movement of the upper head of the stitcher the former 145 will move down and bend the staple stock over the loop-bar 141. Then the latter will be rocked out from the staple loop and the dog pins 161 will engage the incline of the ribs 165 and rock the dog out from engagement with the former. Further downward movement of the head through the spring 169 will present the former and the staple therein to the box blank beneath the former. Continued downward movement of the head will cause the driver 179 to engage and drive the staple into the stock, the points of the staple being bent over or clenched by engagement with a usual anvil beneath the blank.

This marks the completion of the cycle of stitching operations for stapling the binding wire to the box section.

The head 81 is then lifted, the former being held by the spring 169 on the box blank until after the dog 155 is rocked by its spring back to its original position (Fig. 7) in readiness again to engage the top of the former. Then the driver 179 engages the upper end of the former recess 151, and lifts the former up above the loop bar and the slide 173 engages the loop bar holder 143 and rocks the bar beneath the former in readiness to form another staple.

The box blank carriage is then fed a step, a length of staple stock is fed into the stitcher and another staple is formed and driven as before. This series of operations is continued until the binding wire has been secured to all the sections essential for forming the complete box blank.

In operation, the carriage sprocket wheels are adjusted to conform to the length of the side of a box desired and a suitable number of stitchers are placed on the cross-head bars in the position to properly locate the binding wires. The latter are then led from their reels through their guides and applied to the box blank sections and the carriage is fed by the manually controlled feed handle 37 to bring the first box blank section in proper position relative to the stitchers. The carriage feed is then thrown in and the carriage is automatically fed step-by-step. During the interval between steps the stitcher forms and applies staples to the sections to secure the binding wire thereto as described. As spacer blocks approach the stitcher mechanism they will feel for the detector pawls which will automatically engage said spacer blocks and either prolong the feed step at a normal rate of speed, or accelerate the speed during a feed step of normal duration, thereby carrying the space between adjacent sides beneath and beyond the stitcher mechanism a sufficient distance to prevent any application of staples at the joints between said sides. The accelerated or prolonged feed will depend upon the arrangement of the driving connections of the detector.

If in the course of the automatic step-by-step and skip feeds it is desired to modify either, the manually operable feed mechanism is available for this purpose and conveniently accessible to the operative as he stands by the side of the machine controlling the operations thereof.

In some instances a single side of the box may be composed of a number of sections of different or irregular widths and it may be desired to avoid applying a staple to the joints between such sections. This may be done by controlling the feed by the manually operable handle.

In some instances it may be desired to variously space the staples or eliminate a staple at one place, as at a joint between sides or other places. This may be done by the manual control of the carriage feed or by tripping the actuating pawl 121 of the staple stock feed ratchet 119.

By my invention is provided a machine which is simple and effective in construction and operation and adaptable to meet a wide range of varying conditions.

It will be understood that it is not indispensable that all of the features of the invention be used conjointly since some of them may be used separately to advantage.

It will also be understood that while a carriage of the work-supporting type is shown for example, obviously the invention is not restricted to such type and may be embodied in machines employing other types of work-conveying or work-forwarding means.

Having described one illustrative embodiment of the invention without limiting the same thereto, what I claim as new and desire to secure by Letters Patent is:

1. In a machine of the class described, the combination of a conveyer for feeding box sections; means to advance said conveyer step-by-step: means to introduce binding material to said sections; means to staple said material to said sections at intervals; and automatic means including a device propulsively coöperating with said conveyer for giving the latter a skip feed to prevent stapling at joints between sections.

2. The combination of a step-by-step fed conveyer for feeding box sections; means for introducing binding materials to said sections; means for securing said material to said sections; and conveyer feeding mechanism automatically controlled to prolong a feed step to bring the work to a desired fastener-receiving position, including a conveyer connected member located

37 AVAILABLE COPY to be actively engaged by feeding means during a determined interval to shift the work to such position.

3. The combination of a step-by-step fed conveyer for receiving box sections; means to introduce binding wire thereto; means to secure the binding wire to said sections; and conveyer responsive means for accelerating the feed to prevent application of securing means between sections.

4. In a machine of the class described, the combination of a conveyer for receiving box sections; means to feed said conveyer step-by-step; means to introduce wire to said sections; means progressively to secure said wire to said sections; and conveyer controlled detector means to prolong a step feed of said conveyer while maintaining the normal feed speed thereof.

5. In a machine of the class described, the combination of a conveyer for receiving box sections; spacers on said conveyer; means to feed said conveyer step-by-step; and means for speeding up the feed including a detector arranged to engage a spacer as it approaches a stapling mechanism to avoid stapling at a joint between adjacent box sections.

6. In a machine of the class described, the combination of a conveyer, means to feed the same step-by-step; spacer means on said conveyer for determining the assembled relation of box sections on said conveyer; and means to vary the feed of said conveyer, including a device movable at a speed different from that of said conveyer and rendered effective by said spacer means.

7. In a machine of the class described, the combination of a conveyer, spacers for the work thereon; means to feed said conveyer step-by-step; and actuating means for progressively engaging said spacers to vary the feed of said conveyer.

8. In a machine of the class described, the combination of a conveyer; means to feed the same step-by-step; continuously actuated means for giving said conveyer a skip feed; and means on the latter for rendering said continuously actuated means intermittently effective.

9. In a machine of the class described, the combination of a conveyer; means to feed the same step-by-step; and auxiliary feed means to avoid stapling at a joint between adjacent box sections comprising reciprocatory means having provision for rendering the same effective to engage and feed said conveyer on movement in one direction and ineffective on movement in an opposite direction.

10. In a machine of the class described, the combination of a step-by-step fed conveyer for receiving box sections; means to feed the same step-by-step; and additional feed means to avoid stapling at a joint between adjacent box sections comprising a slide; means to reciprocate the latter, and means on said slide effective for feeding said conveyer on movement of said slide in one direction and ineffective for feeding said conveyer on movement of said slide in an opposite direction.

11. In a machine of the class described, the combination of a conveyer; means to feed the same step-by-step; a carrier; a spring pressed pawl on said carrier; an eccentric for reciprocating said carrier; and means on said conveyer adapted to be engaged by said pawl to impart a skip movement to said conveyer.

12. In a machine of the class described, the combination of a frame; sprocket wheels; former chains thereon; means to feed said wheels step-by-step; guide means on said frame; a carrier in said guide means; a pawl on said carrier; a rocking arm; a link connecting the latter to said carrier; an eccentric for rocking said arm; and means on said former chains for rendering said carrier pawl effective to impart feed movement to said chains.

13. In a machine of the class described, the combination of a conveyer; means to feed the same step-by-step; and means to impart movement to said conveyer including a spring pressed pawl; means to limit the movement of said pawl; and means on said conveyer adapted to be engaged by said pawl.

14. In a machine of the class described, the combination of a conveyer for receiving box sections; means for spacing said sections on said conveyer, and means for feeding the same step-by-step including a slotted rocking arm; a pawl pivoted thereon, an eccentric, means connecting said eccentric to said arm adjustably secured in said slot, and means manually operable during the operation of the machine for varying the distance of said connecting means from the fulcrum of said arm.

15. In a machine of the class described, the combination of a conveyer having provision for receiving and spacing box blank sections, and means for feeding the conveyer step-by-step including a ratchet; a slotted rocking arm; a pawl pivoted on said arm; means for rocking said arm having an adjustable connection with the slot, and means for moving said connection to positions for normal step and skip feeds.

16. In a machine of the class described, the combination of a conveyer having provision for receiving and spacing box blank sections; automatic means for feeding said conveyer step-by-step, and manually controlled means operating through said automatic means for varying the length of a step.

17. In a machine of the class described,

BEST AVAILABLE COPY the combination of a conveyer having provision for receiving and spacing box blank sections; and means for feeding the conveyer step-by-step including a pawl and ratchet; an arm carrying said pawl, and means for varying the effective length of said arm during the running of the machine.

18. In a machine of the class described, the combination of a conveyer having provision for receiving and spacing box blank sections; and means for feeding the conveyer step-by-step including a pawl and ratchet; a slotted arm carrying said pawl; a pin in said slot; means coöperating with said pin to rock said arm and impart a step feed to said pawl, and means for adjusting said pin in said slot during the operation of the machine to vary the length of the feed step.

19. In a machine of the class described, the combination of a conveyer having provision for receiving and spacing box blank sections; and means for feeding the conveyer step-by-step including a pawl and ratchet, an arm carrying said pawl; means for rocking said arm and means for varying the effective length of said arm including a pin and slot connection, and a manually operable lever for varying the position of said pin in said slot.

20. In a machine of the class described, the combination of a step-by-step fed conveyer for receiving box sections; means to apply binding means thereto; means to staple said binding means to said sections; pawl and ratchet means to feed staple stock, and means including a manually controlled cam coöperating with said pawl and adapted to be set in a position to interrupt the staple stock feed.

21. In a machine of the class described, the combination of a conveyer; means to feed the same step-by-step; means to apply binding wire to sections conveyed by said carriage; means to staple said wire to said sections; pawl and ratchet means to feed staple stock, and manually operable means for controlling said feed including a manually operable cam adapted to be set in a predetermined position for throwing said ratchet out of effective position.

22. In a machine of the class described, the combination of a conveyer; means to feed the same step-by-step; and means to avoid stapling at a joint between adjacent box sections comprising means movable relatively to said feed means and having provision for rendering the same effective to feed said conveyer independently of said feeding means.

23. In a machine of the class described, the combination of a conveyer; means to feed the same step-by-step; means to staple binding wire to the box sections conveyed by the conveyer; and means to avoid stapling at a joint between sections comprising means operable independently of said feeding means.

24. In a box machine, the combination of a conveyer having provision for receiving and spacing box blank sections; and means for feeding said conveyer step-by-step including a ratchet and a reciprocating pawl coöperating therewith; and means manually operable during the running of the machine for varying the length of reciprocation of said pawl.

25. A box machine comprising in combination a conveyer having provision for receiving and spacing box blank sections; and means for feeding said conveyer step-by-step having provision for varying the length of the step feed during the running of the machine; said machine being adapted to operate without interruption on materials for a plurality of boxes.

26. In a machine of the class described, the combination of a conveyer for feeding box sections; means to introduce binding material to said sections; fastener-setting mechanism to secure said binding material to said sections at intervals; and conveyer-controlled propulsively-acting detector means constructed and arranged to cause presentation of selected fastener positions on the work to the action of said fastener-setting mechanism.

27. A machine of the class described comprising coöperating work-feeding and binding-wire applying mechanisms for wiring assembled box parts to form a blank or blanks, the machine containing instrumentalities for selectively locating a plurality of wire fastenings, said instrumentalities comprising controlling members located with reference to selected fastener positions in fixed relation to the work and means successively propelling said members to advance said selected fastener positions to fastener-receiving relationship with the binding-wire applying mechanism regardless of the extents of the preceding work movements and consequent positions in which said members are engaged by said propelling means.

28. A machine of the class described comprising, in combination, work-conveying means for box materials; fastener-setting mechanism; means to introduce binding material for attachment by said mechanism to the box materials; feed controlling devices disposed longitudinally of the work-conveying means and located with reference to selected fastener positions on the work; and feeding mechanism including means operating upon said feed controlling devices to advance the work through feed steps of variably selected length to present said selected fastener positions in fastener-receiving relationship to the fastener-setting mechanism.

BEST AVAILABLE COPY

29. A machine for use in making boxes comprising, in combination, fastener-setting mechanism for applying binding wire to box parts; work-forwarding means; feeding devices having connection with the work-forwarding means and disposed lengthwise thereof relatively to selected fastener-receiving points thereon; and work-feeding means for feeding the work to the fastener-applying mechanism, including means operating upon said feeding devices to advance the work through feed steps of variable selected lengths to present said selected fastener-receiving points in fastener-receiving relationship to the fastener-applying mechanism.

30. A machine for use in making boxes comprising, in combination, a work-support; fastener-setting mechanism; feed mechanism including means to cause feed steps of variable selected lengths to bring the work to selected positions to receive fasteners, said means comprising controlling members movable with the work and motion-imparting means adapted to engage said controlling members to carry the work to fastener-receiving positions.

31. A machine of the class described comprising, in combination, a conveyer for feeding box materials; means to introduce binding material; fastener-setting mechanism to secure said binding material to the box materials; and conveyer feeding mechanism automatically controlled to vary the feed for submitting the work in desired positions to the fastener-setting mechanism, including a reciprocating conveyer shifting means and conveyer-connected members located to be actively engaged thereby during automatically selected fractions of the throw of said means to effect movement of the work to said desired positions.

32. The combination of a conveyer for feeding box parts; means for introducing binding material to said parts; means for securing said material to said parts; means for causing step-by-step movement of said conveyer; and automatic motion-imparting means, including controlling means therefor connected with the conveyer, to prolong a feed step.

33. A machine of the class described comprising, in combination, work-conveying means; fastener-setting means; means for advancing said work-conveying means; and motion-imparting means coöperating with said work-conveying means to increase the work-feeding movement.

34. A machine for use in making wire-bound boxes comprising, in combination, means including fastener-setting mechanism for applying binding wire to box sections; means to cause relative progression between the work and said mechanism; adjustable means normally controlling the progression to locate fasteners at desired intervals; automatic means independently controlling the progression for definitely positioning fasteners in desired relation to the work; and manually operable means for independently changing the relation of the work to said mechanism.

35. A machine for use in making wire-bound boxes comprising, in combination, means including fastener-setting mechanism for applying binding wire to box sections; and means to cause relative progression between the work and said mechanism, including means normally controlling the progression to locate fasteners at determined intervals; automatic means independently controlling the progression for definitely positioning fasteners in desired relation to the work; and adjusting means for the normal controlling means affording provision for varying the normal spacing interval.

36. A machine for use in making boxes comprising, in combination, a work support; binding-wire-applying mechanism; and means for causing relative progression between said mechanism and the work, including a feed chain and a motion-imparting device adapted to propulsively engage said chain intermittently.

37. A machine for use in making wire-bound boxes comprising, in combination, work-forwarding means; fastener-setting mechanism; and feeding means including a series of adjustable members having connection with the work-forwarding means, and a motion-imparting device adapted to propulsively engage said members successively; said machine being adapted to operate without interruption on materials for a plurality of boxes.

38. A machine for use in making wire-bound boxes comprising, in combination, work-forwarding means; fastener-setting mechanism; and feeding means including a series of members adjustably secured to the work-forwarding means, and a motion-imparting device adapted to propulsively engage said members successively.

39. A machine for use in making wire-bound boxes comprising, in combination, work-forwarding means; fastener-setting mechanism; and work-feeding means including adjustable controlling members having connection with the work-forwarding means, and a motion-imparting device adapted to propulsively engage said controlling members successively to advance the work variable distances intermittently; said machine being adapted to operate without interruption on materials for a plurality of boxes.

40. A machine for use in making boxes comprising, in combination, a work support; fastener-setting mechanism; and means for causing relative progression between said

BEST AVAILABLE COPY mechanism and the work, including a feed chain having a plurality of selectively-spaced members adjustably secured thereto, and a motion-imparting device adapted to propulsively engage each of said members in turn and advance it to the same point relative to said fastener-setting mechanism.

41. A machine for use in making boxes comprising, in combination, a work support; fastener-setting mechanism; and work-feeding mechanism including means to cause feed steps of variable selected lengths to bring the work to selected positions to receive fasteners; said means comprising controlling members movable with the work and motion-imparting means adapted to successively engage said controlling members to carry the work to fastener-receiving positions.

42. A machine for use in making boxes comprising, in combination, work-forwarding means adapted to receive materials for a plurality of box blanks; fastener-setting mechanism; and means to present selected fastener-receiving points on said plurality of boxes in fastener-receiving positions, including a plurality of members having connection with the work-forwarding means and located at points corresponding to selected fastener-receiving points on the work, and a motion-imparting device adapted to engage each of said members in turn and advance its corresponding fastener-receiving point on the work to fastener-receiving position.

43. A machine for use in making boxes comprising, in combination, endless work-forwarding means; fastener-setting mechanism; and means to cause relative progression between said mechanism and the work in steps of controlled length to locate fasteners at desired points thereon, including a series of devices having connection with the work-forwarding means and located relative to selected fastener-receiving points on the work, and a motion-imparting member adapted to engage each of said devices in turn and advance its corresponding fastener-receiving point to fastener-receiving position.

44. A machine for use in making boxes comprising, in combination, fastener-setting mechanism; a conveyer for box parts; and means to feed said conveyer in steps of controlled length to present selected fastener-receiving points on the work to said mechanism, including a reciprocating actuator adapted during variable fractions of its throw to propulsively engage successively a series of members having connection with the conveyer and movable therewith; said machine being adapted to operate without interruption on materials for a plurality of boxes.

45. A machine for use in making boxes comprising, in combination, a work holder; mechanism to apply binding wire to box parts; and means to cause relative progression between said mechanism and the box parts in controlled steps of varied lengths, including a series of adjustable members having connection with said work holder, and an actuator adapted to propulsively engage said members successively; said machine being adapted to operate without interruption on materials for a plurality of boxes.

46. A machine for use in making wire-bound boxes comprising, in combination, instrumentalities for wiring box material; means for feeding successive work-assemblies thereto; detector means responsive to the passage of intervals between the assemblies; and means controlled thereby for effecting relative adjustment between said instrumentalities and the work.

In testimony whereof, I have signed my name to this specification.

OSCEOLA C. THOMPSON.